INVENTOR
Myron M. Kinley

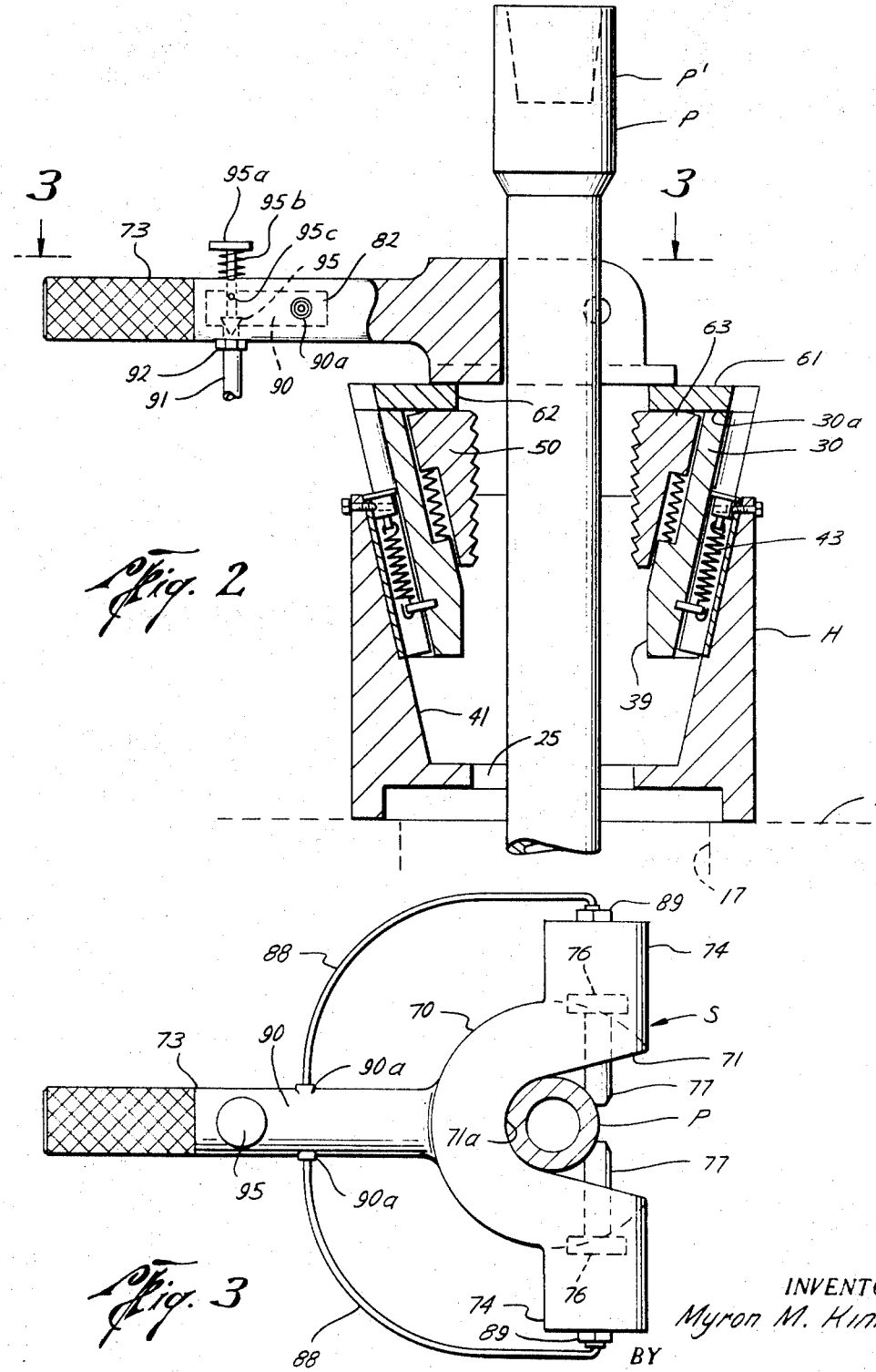

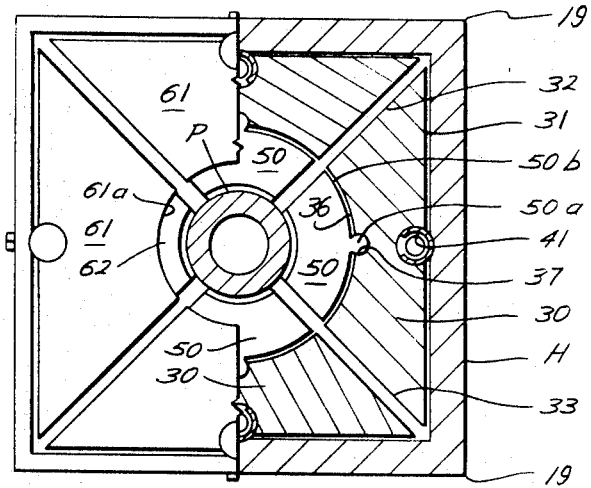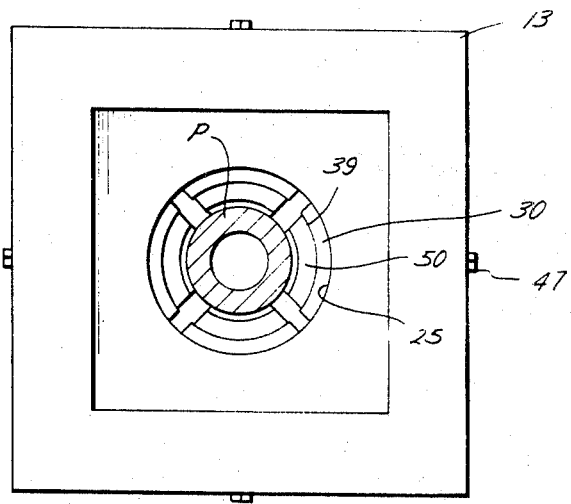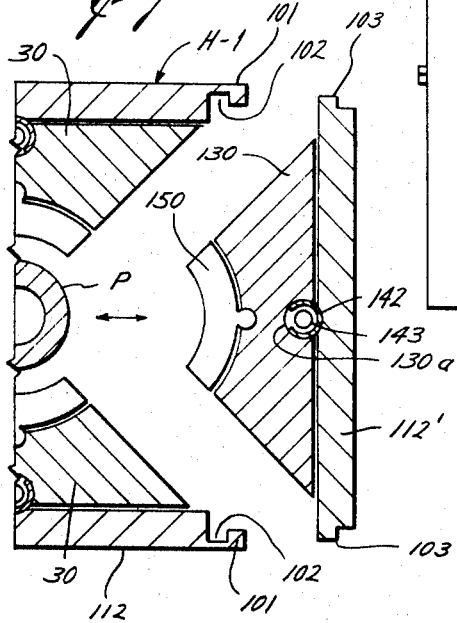

Oct. 14, 1969
M. M. KINLEY
3,472,535
AUTOMATIC PIPE SLIP APPARATUS
Filed Oct. 20, 1967
4 Sheets-Sheet 4
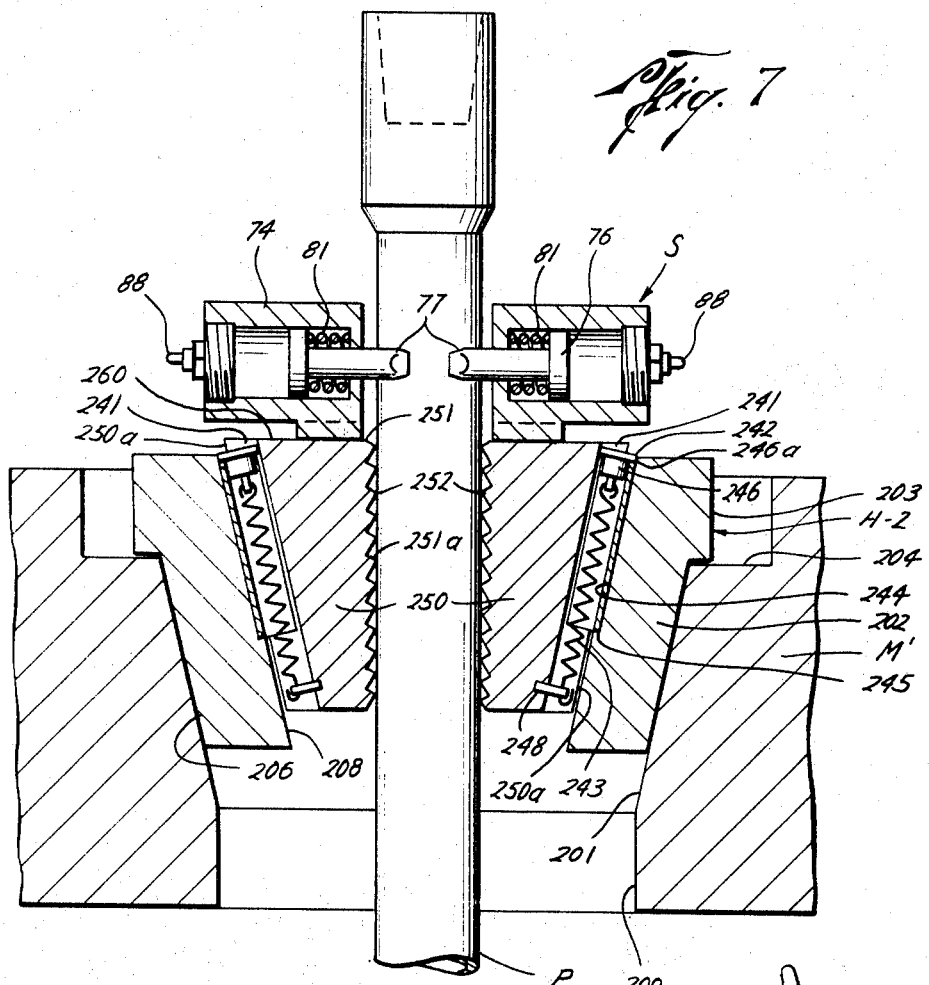
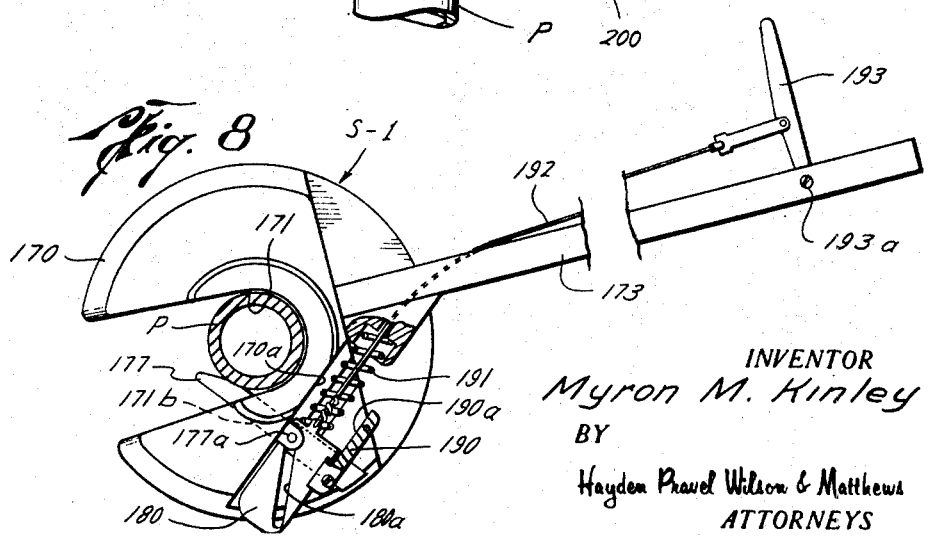
INVENTOR
*Myron M. Kinley*
BY
*Hayden Pravel Wilson & Matthews*
ATTORNEYS United States Patent Office 3,472,535
Patented Oct. 14, 1969

3,472,535
AUTOMATIC PIPE SLIP APPARATUS
Myron M. Kinley, Chickasha, Okla., assignor to J. C. Kinley Company, a corporation of Texas
Filed Oct. 20, 1967, Ser. No. 676,920
Int. Cl. F16l 21/00; E21b 19/10
U.S. Cl. 285—145                     10 Claims

ABSTRACT OF THE DISCLOSURE

An automatic pipe slip apparatus adapted to be positioned on a rotary table for uniformly gripping and supporting a joint of pipe extending therethrough. Such automatic slip apparatus comprises a slip holder having segmented gripping jaws spaced circumferentially therein for gripping a joint of drill pipe at a plurality of circumferentially spaced points on a common elevation and a slip actuator which moves the slip jaws uniformly into gripping engagement with the pipe so that all of the jaws grip the pipe with substantially the same force. Thereafter, downward movement of the pipe wedges the slips against the pipe to support the joint pipe and any additional string of pipe suspended therebelow in the automatic pipe slip apparatus.

BACKGROUND OF THE INVENTION

Field of the invention

The present invention relates to a new and improved automatic pipe slip apparatus adapted to be mounted on a rotary table for uniformly gripping and supporting a string of pipe suspended therebelow.

Description of the prior art

Heretofore, various slip devices have been used which wedge against a string of drill pipe extending through a rotary table to support the drill string therein; however, some of the prior art devices, such as automatic slips, have the disadvantage of being large and expensive and other devices such as the conventional manual slips tend to scar and damage the pipe. Manual slips are particularly prone to damage a drill pipe when the master bushing in the rotary or the square shaped opening in the rotary in which the slips are seated is worn, especially if there is an irregularity in the seating surface. In this case, one or more of the manual slip elements is frequently tilted or misaligned so that they do not all engage the drill pipe at a common elevation thereby causing an uneven distribution of the weight of the drill string on the various individual slip segments or jaws. Since drill strings frequently weigh several thousand pounds, this causes the jaws or slip segments to scar or mar the pipe and in some instances to dent or even penetrate the pipe wall.

SUMMARY OF THE INVENTION

Briefly, the present invention comprises an automatic pipe slip apparatus which includes a slip holder adapted to be positioned on a rotary and having a plurality of slip elements therein which are normally retracted out of engagement with the uppermost joint of pipe in a drill string extending therethrough. The slip elements are adapted to be moved laterally into engagement with the drill pipe by means of a slip setting device which may be latched to the drill pipe and moved downwardly therewith. The slip setting device actuates the slip jaws to move them laterally into gripping engagement with the pipe so that additional downward movement of the pipe wedges the slip jaws in the slip holder to thereby support the pipe.

It is an object of the present invention to provide a new and improved slip apparatus adapted to be positioned on a rotary table so as to encircle the central opening therein. Such apparatus includes a plurality of circumferentially spaced jaws for gripping around the pipe at a substantially common elevation so that when the pipe is supported therein, the weight of the pipe string is distributed substantially uniformly on each of the jaw segments. This apparatus also includes a slip setting device for actuating the slip jaws to move them into gripping engagement with the pipe.

Another object of the present invention is to provide a new and improved automatic pipe slip apparatus having a slip holder for holding a plurality of circumferentially spaced slip jaws mounted on slip jaw carriers and having a slip setting device adapted to be latched to a drill pipe for movement therewith so as to enage the slip jaw carriers for moving the slips into gripping engagement with the drill pipe as such pipe is lowered through the automatic slip apparatus.

BRIEF DESCRIPTION OF THE DRAWINGS

FIG. 2 is a vertical sectional view taken on line 2—2 of FIG. 1 showing the apparatus of the present invention with the slip jaws in the open position;

FIG. 3 is a view taken on line 3—3 of FIG. 1 showing the slip setting device of the present invention;

FIG. 4 is a plan view partly in section taken on line 4—4 of FIG. 1 showing additional details of construction of the apparatus of the present invention;

FIG. 5 is a view taken on line 5—5 of FIG. 1;

FIG. 6 is an exploded view showing an alternate embodiment of the present invention;

FIG. 7 is a vertical sectional view showing another embodiment of the apparatus of the present invention; and FIG. 8 is a plan view of another embodiment of the slip setting device.

DESCRIPTION OF THE PREFERRED EMBODIMENTS

Figure 1:
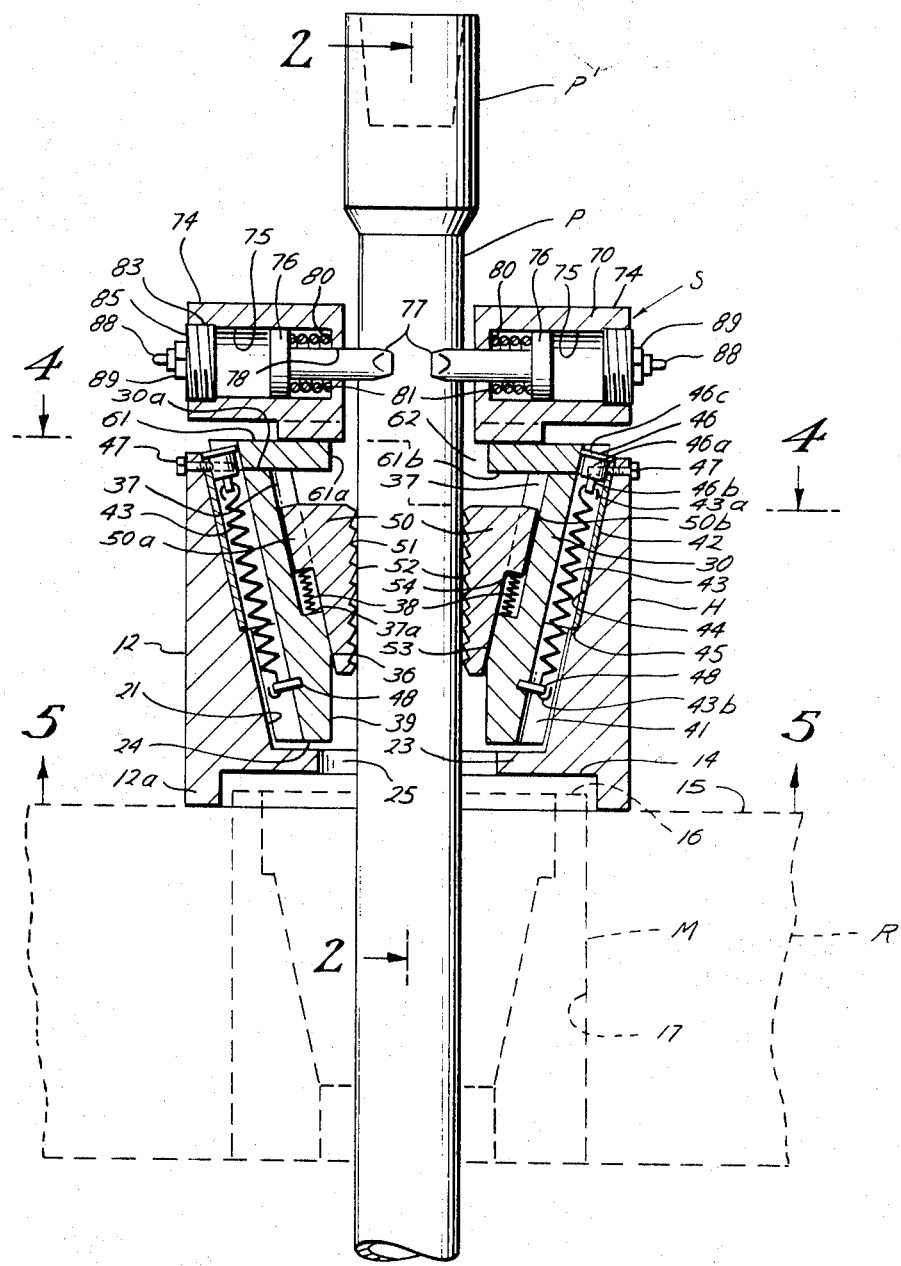
FIG. 1 is a view partly in elevation and partly in section showing the apparatus of the present invention positioned on a rotary table with a pipe string extending therethrough and with the slip jaws in the closed position for gripping the pipe.

Briefly, the preferred embodiment of the present invention as shown in FIG. 1 of the drawings comprises a slip holder H having a plurality of pipe gripping elements E therein for gripping and holding a pipe P. Such slip holder H is adapted to be positioned over a master bushing M in a rotary table R for receiving and gripping a string of drill pipe P extending through the slip holder H and the rotary R. A slip setting device S is also provided for moving the slip elements E into gripping engagement with the pipe P for gripping and holding such pipe as will be described in detail hereinafter.

Considering now the apparatus of the present invention in more detail, the slip holder H preferably comprises a square unitary body 12 which may be molded or cast of suitable material such as iron or the like. The body 12 preferably has a downwardly projecting annular rim or foot 12a which extends around the square shaped hole 17 in the rotary R and supports the holder H on the rotary table. As shown, the annular foot 12a also surrounds the master bushing M in the square shaped hole 17 and supports the bottom 14 of the holder H above the top 16 of the master bushing M. Thus, the slip holder H can be used with or without a master bushing M in place in the rotary R, as desired.

The slip holder H has an opening extending therethrough for receiving the pipe P, the upper part of which preferably comprises a plurality of inclined plane surfaces 21 for receiving and supporting slip jaw guides 30. Such surfaces 21 are inclined inwardly and downwardly from adjacent the top 22 to a laterally extending annular projection 23 having a horizontally extending upper shoulder 24 adjacent the lower end of the surfaces 21. Such shoulder 24 acts as a stop to limit the downward movement of the slip carrier 30. A passage or opening 25 extends downwardly through the annular projection 23 to the bottom 14 to provide an opening for receiving the pipe P which extends through the slip holder H.

As best seen in FIG. 4 of the drawings, the slip jaw carriers 30, which are provided for supporting and moving the slip jaws 50, comprise wedge shaped members which have a rear or outward inclined surface 31 and a pair of converging side surfaces 32 and 33. Such surfaces 32 and 33 extend diagonally from the corners 19 of the square slip holder H toward the pipe P which is centrally disposed therein. Such slip jaw carriers 30 are provided with a concave inner surface 36 which is curved about an axis which is substantially parallel to the rear or outward inclined surface 31 of the carrier 30.

A longitudinally extending groove 37 is provided in the surface 36 for receiving and guiding an interfitting lug 50a which is formed on the rear side of the slip jaws 50 as will be described hereinafter. Such groove 37 terminates at a lower shoulder 37a which provides a stop for a slip jaw return spring 38 which will also be described hereinafter. Also, such slip carriers 30 include a lower arcuate surface 39 which is substantially concentric of the longitudinal axis of the pipe P.

A longitudinally extending passage or opening 41 is provided in the slip carriers 30 adjacent the rear surface 31 and substantially parallel thereto. Such opening 41 is provided for receiving a slip carrier guide and return spring cover 42 (FIG. 1) which houses a carrier return spring 43 provided for urging the slip carrier 30 upwardly toward the retracted position such as shown in FIG. 2 of the drawings. As shown, the housing H is provided with an arcuate groove 44 having a lower shoulder 45 which is provided for securing the arcuate member 42 in the housing H. The upper end 43a of the spring 43 is connected to a spring retainer 46 secured in the upper end of the arcuate guide 42. Such spring retainer 46 includes a body portion 46a having a pin 46b depending therefrom which is provided with an opening (not shown) for receiving the end 43a of the spring 43. An upper cap or cover 46c is provided on top of the body 46a for engaging the upper edge of the guide member 42. Also, a screw or bolt 47 is provided which extends through the arcuate guide 42 and into the body 46a of the spring retainer for securing same in the arcuate groove 44 in the slip holder H. Also, a pin 48 is provided in the slip carrier 30 for receiving the lower end 43b of the spring 43 and connecting it to such slip jaw carrier 30.

The slip jaws 50 comprise arcuate wedge shaped members having an inner arcuate surface 51 with pipe engaging teeth 52 thereon; such inner arcuate surface 51 extends concentrically of the pipe P and is curved about an axis that is substantially identical to that of the pipe or tubular member P.

Each slip jaw 50 preferably has a longitudinally extending lug or projection 50a thereon which extends into the groove 37 and is movable longitudinally therein for guiding the slip jaws 50. A lower shoulder 54 on the lug 50a provides an upper stop for the slip jaw return spring 38.

As shown, each slip jaw 50 preferably has a rear convex surface 50b on the rear or outer side thereof which has substantially the same radius as the mating concave surface 36 on the slip carrier 30. Thus, it will be appreciated that the slip jaw 50 and the slip jaw carrier 30 may be moved longitudinally with respect to each other as will be explained in detail hereinafter.

In the preferred form of this invention, laterally extending covers 61, each having an arcuate portion 61a to form a central opening 62 are connected to the upper ends 30a of the slip jaw carriers 30 by means of screws (not shown) or other suitable securing means as desired. The lower surface 61b of each cover 61 extends radially inwardly from the slip jaw carriers 30 to provide an upper stop to limit the upward travel of the slip jaws 50 with respect to such slip jaw carriers 30. Also, the covers 61 are adapted to receive the slip setting device S which is provided for actuating the slip jaw carriers 30 so as to move the slip jaws 50 into engagement with pipe P as will be described in detail hereinafter.

Such slip setting device S which is best seen in FIGS. 1–3 preferably comprises a body 70 having a U-shaped notch or opening 71 in one side thereof for receiving and centering the pipe P relative to such device S. A handle 73 projects laterally from such body 70 and on the opposite side thereof from the U-shaped opening 71.

As shown, a cylinder 74 is formed integrally on each side of the body 70 with such cylinders disposed in axial alignment with each other and on opposite sides of the U-shaped opening 71. As best seen in FIG. 1 of the drawings, each cylinder 74 is provided with a main bore 75 for receiving a piston 76 having a clamping or latch pin 77 which extends through a counterbore 78 to project inwardly into the U-shaped opening 71 for engaging and latching the pipe P.

An annular shoulder E is provided between the main bore 75 and the counterbore 78 for receiving one end of a piston return spring 81. The opposite end of the return spring 81 engages the inner side of the piston 76 for normally urging it and the pin 77 laterally away from the pipe P.

A second counterbore 83 having threads therein is provided at the outer end of the main bore 75 for receiving a threaded end or cap 85 which closes the outer end of such main bore 75. An air pressure or other fluid supply line 88 of steel or other suitable material is shown extending from the end member 85 to a chamber or manifold 90 formed in the handle 73. Such fluid supply lines 88 are connected to the closed members 85 by means of standard threaded couplings 89 and similarly to the body of the handle 73 by standard couplings 90a.

An air inlet or fluid supply line 91 which is connected to a suitable source such as an air compressor or the like (not shown) is also connected to the handle body 73 by means of a suitable coupling 92. A suitable control valve 95 having a valve actuator button 95a or any other valve control is provided in the handle 73 for controlling the flow of air pressure or fluid from the supply source through the chamber 90 and supply lines 88 into the cylinders 74. When the valve button 95a is released, it is urged upwardly by spring 95b to open valve 95a, allowing air pressure to flow into the chamber 90 from which it is conducted via the conduits 88 to the cylinder 74 for moving each of the pistons 76 and the piston pin 77 into the U-shaped opening 71 for engaging a pipe P. For releasing the air pressure in chamber 90, a bleed port 95c or any other suitable means is provided for venting chamber 90 to atmosphere when the valve 95 is closed. Thus, to return the pistons to a retracted or open position for disengagement of the latch pins 77 from the pipe P so as to permit removal of the setting device S therefrom, the button 95a is depressed to exhaust pressure from the pistons 76, whereby springs 81 urge the pistons 76 and pins away from each other. It will be understood that the operation of the springs 81, valve 95, and other parts may be in reverse if desired.

In operation, the automatic pipe slip apparatus of the present invention is used for supporting a string of pipe while making or breaking threaded connections between stands of pipe during the running in or raising of pipe in a well. The slip holder H is normally positioned on the rotary R so as to align the slips 50 with the opening in the rotary or in the master bushing M through which the pipe P extends.

Initially, the slip holder H is positioned on the rotary R and a string of pipe P, suspended by conventional elevators or the like in a derrick thereabove (not shown), is lowered into the holder H (FIG. 2) with the slip carriers 30 in the retracted position so that the slips 50 not do not engage the pipe P. In order to move the slips 50 into gripping engagement with the pipe P, the slip setting device S is next latched on the pipe P at a point below a joint or upper end P' of the stand of the pipe P being lowered into the well.

It will be appreciated that the latching pins 77 are normally in a retracted position so that the U-shaped opening 71 is open for receiving the pipe P. In order to latch the pipe P in the slip setting device S, the body 70 is moved laterally into position on the pipe P so that one side of the pipe P engages the inner surface 71a of the U-shaped opening 71. Thereafter, the valve 95 is actuated to supply air pressure or other fluid through the conduits 88 to the cylinders 74, as explained. Such fluid pressure moves the pistons 76 laterally toward each other, thereby forcing the latch pins 77 towards each other and into engagement with the pipe P on the opposite side of its longitudinal axis from the inner surface 71a of the U-shaped opening 71 to thus latch the slip setting device S to the pipe P for movement therewith.

With the device S thus latched on the pipe P, the pipe is then lowered so that the slip setting device S engages the upper covers 61 of the slip carriers 30. Thereafter, continued lowering of the pipe P and the slip setting device S will move the slip carriers 30 and the slips 50 downwardly in the slip holder H. As such slip carriers 30 move downwardly on the inclined surfaces 41, the slip jaws 50 will be moved downwardly and inwardly into engagement with the pipe P as shown in FIG. 1 of the drawings. After such slip jaws 50 have been moved into engagement with the pipe P, further downward movement of such pipe P will tightly wedge such slip jaws 50 against the inclined slip jaw carriers 30 to thereby grip the pipe and support it in the slip holder H. It will be appreciated that while the slip setting device S is latched to the pipe P sufficiently tightly to enable such setting device S to move downwardly with the pipe P to stretch the springs 43 and thereby move the slip carriers 30 so that the jaws 50 are moved laterally into engagement with the pipe P, once the jaws 50 have engaged the pipe, they will lock against such pipe tightly enough that the slight additional downward movement required to tightly wedge the slip jaws 50 in the carriers 30 will cause the pipe P to slip through the slip setting device S. Thereafter, the valve 95a in the handle 73 is depressed so that the pressure in the cylinders 74 is exhausted to atmosphere through the bleed port 95c, permitting springs 81 to return the pistons 76 to thereby retract the locking pins 77 out of engagement with the pipe P to thus release it from the slip setting device S. In some instances, prior to releasing the setting device S from the pipe P, downward movement of the pipe P and the slip jaws 50 due to the weight of the pipe P will cause the pipe P to slip slightly in the setting device S.

In the normal operation of the preferred embodiment of this invention, the slip jaws 50 will engage and lock the pipe P before the lower end of the slip jaw carriers 30 have reached the laterally projecting annular shoulder 24. Also, it will be appreciated that after the slip jaws 50 have engaged the pipe P, any additional downward movement of such pipe P and slip jaws 50 will compress the slip jaw return spring 60 as well as further extend the slip jaw carrier return springs 43. Thereafter, to release the grip of the slip jaws 50 from the pipe P, such pipe P is lifted vertically upwardly to remove the weight of the drill string P from the wedge shaped slip jaws 50 and slip jaw carriers 30. Once the wedging force has been removed from such slip jaws 50, the return springs 60 will lift the slip jaws 50 relative to the slip jaw carriers 30 and the return springs 43 will also move the slip jaw carriers 30 upwardly along the inclined surface 41 to thereby move such slip jaws 50 laterally or radially outwardly away from the pipe P and return to their retracted position shown in FIG. 2 of the drawings. With the slip jaws 50 thus disengaged from the pipe, it may be moved in the rotary, as desired.

An alternate embodiment of the apparatus of the present invention is shown in FIG. 6 of the drawings. In such alternate embodiment, the slip holder H–1 is substantially the same as the slip holder H except that the body 112 comprises a three sided U-shaped housing having a removable fourth side 112'. As shown, the open ends 101 of the body 112 are provided with longitudinally extending grooves 102 which receive corresponding longitudinally extending tongues or projections 103 on the removable side 112'. With this tongue and groove arrangement, the removable side 112' may be slipped vertically upwardly out of the body 112 to remove it therefrom and open the member H' so that it may be slipped laterally onto a pipe P extending through the rotary without requiring that such pipe P be withdrawn from the rotary R. The removable side portion or segment 112' includes a slip carrier 130 having a slip 150 mounted thereon in the same manner that the slip jaw 50 is mounted on the slip jaw carrier 30. Also, such slip carrier 130 is provided with a longitudinally extending passage 130a for receiving a guide tube 142 which houses a slip guide return spring 143. As shown, the removable slipholder 112' is provided with slip jaw carriers 130' and slip jaws 150' which are the same as the slip jaw carriers 30 and the slip jaws 50 shown in FIG. 4 of the drawings.

After the U-shaped body 112 has been positioned around a pipe P, the projections or tongues 103 on the opposite ends of the removable side 112' may be slipped longitudinally into their respective grooves 102 in the body 112 to provide an automatic pipe slip apparatus which completely encircles the pipe P for gripping and holding same. Suitable screws or bolts (not shown) are provided for locking or securing the removable side 112' to the U-shaped body 112 and also suitable stops or shoulders (not shown) are preferably provided at the bottom of the longitudinally extending grooves 102 for providing additional support for the removable side 112'.

It will be appreciated that when the slip holder H' of the present invention is positioned around the pipe P with the removable side 112' in place thereon that its operation is substantially the same as that of the unitary slip holder H described hereinabove.

The second alternative embodiment of the apparatus of the present invention is shown in FIG. 7 of the drawings which includes a housing H–2 which is adapted to fit in the tapered opening formed by the inwardly and downwardly inclined surfaces 201 provided in a master bushing M' for receiving various types of slips or wedging devices for securing a pipe P therein.

As shown, such body H–2 comprises an inwardly and downwardly inclined body 202 having an annular shoulder 203 provided thereon which rests on a laterally extending annular shoulder 204 formed in the master bushing M'. Such body 202 has an outer surface 206 which is inclined inwardly and downwardly at substantially the same angle as the inclined surfaces 201 in the master bushing M' and also has an inner inclined surface 208 which is also inclined inwardly and downwardly which provides an inverted truncated conical passage or opening extending through such body H–2 for receiving the segmented slip jaws 250.

As shown in the drawings, each of such slip jaws 250 is provided with a longitudinally extending passage 241 therein for receiving an arcuate guide member 242 which houses a slip jaw return spring 243. A longitudinally extending arcuate groove 244 is provided in the surface 208 of the body H–2 for receiving such arcuate guide 242. The arcuate groove 244 has an arcuate shoulder 245 at the lower end thereof which acts as a stop for supporting the arcuate guide 242. A spring retainer 246 is provided in the upper end of the arcuate guide 242 and it has an opening therethrough for receiving the upper end of the spring 243. A cap or button 246a is provided at the upper end of the spring retainer 246 which rests on the upper edge of the arcuate member 242. A pin 248 is provided near the lower end of the slip jaw 250 and has an opening therethrough for receiving the lower end of the slip jaw return spring 243.

The segmented slip jaws 250 preferably comprise tapered bodies having an outer surface 250a which is inclined inwardly and downwardly at substantially the same angle as the inner surface 208 of the body H–2. Such slip jaws 250 are also provided with arcuate inner surfaces 251 which are concave and have a radius for engaging and gripping of the pipe P which they grip. Such surfaces 251 are provided with suitable teeth or projections 252 for engaging and gripping the pipe P when the slip jaws 250 are moved laterally into engagement therewith. Also, such slip jaw segments 250 are provided with laterally extending surfaces 260 for receiving a slip setting device S as shown in FIG. 7 of the drawings, which is preferably the same as that described above in connection with FIGS. 1–3 and bears like numbers and numerals.

In operation of the FIG. 7 embodiment of the automatic slip apparatus of the present invention, the body H–2 is positioned in the master bushing M' so as to encircle a pipe P extending through the central opening or passage 200 extending through such master bushing M'. It will be understood that such pipe or string of pipe P is suspended by conventional elevators or other means in the derrick above the apparatus of the present invention. When the pipe P is thus suspended, the slip jaws 250 are normally in their retracted position out of engagement with the pipe P and projecting vertically above the top of the slip holder H–2. Such jaws 250 are maintained in the retracted position by means of the slip jaw return springs 243.

When it is desired to grip the pipe P with the slip jaws 250, the slip setting device S is placed on the pipe P and the pistons 76 are moved laterally inwardly by air pressure, fluid pressure, or other suitable means as explained above to project the latching pins 77 inwardly into latching engagement with such pipe P.

With the slip setting device S thus latched to the pipe P, the pipe P is lowered relative to the holder H–2 so that the slip setting device S engages the upper surface 260 of the slip jaws 250. Thereafter, continued lowering of the pipe P and the slip setting apparatus S latched thereto moves the slip jaws 250 downwardly and the inwardly inclined surface 280 in the slip holder H–2 will cause such slip jaws 250 to move radially or laterally inwardly into gripping engagement with the pipe P. After such jaws 250 have firmly latched or gripped the pipe P so as to firmly grip or hold the pipe P and thereby prevent any further downward movement thereof, then the slip setting device S is released and removed from the pipe P.

When it becomes desirable to release the slip jaws 250 from uniformly gripping and engaging the pipe P, the pipe P is moved vertically upwardly by means of conventional elevators or other lifting means. As such pipe P is moved vertically upwardly, the slip jaws 250 which are in gripping engagement therewith are also moved vertically upwardly; however, the slip jaw guides 242 cause such slip jaws 250 to also move radially or laterally outwardly and thereby become disengaged from the pipe P. Thereafter, such pipe P may be either lifted or lowered through the master bushing M' as desired.

It should be understood that slip jaws of various sizes and types may be used, depending upon the diameter of the particular pipe being run as well as other variables. Such jaws may be provided with conventional slip teeth as illustrated, but preferably, the teeth are omitted and instead the jaws have hard surfaced facings such as carbide particles or the like for gripping the pipe P.

With respect to the slip setting apparatus S, it will be appreciated that the pistons which move the latching pins may be moved hydraulically or with air or some other suitable pressure means or, if desired, such latching pins may be manually moved into latching engagement with the pipe P. For example, a modified slip setting device S–1 is illustrated in FIG. 8 wherein a latching pin 177 is manually movable to and from latching engagement with pipe P. A body 170 has a notch 171 for receiving the pipe P when the latch pin 177 is retracted from the latched position shown in FIG. 8. A handle 173 projects from the body 170, preferably on the opposite side from said notch 171. The pin 177 is slidably mounted in a slot 171b so that the pin 177 can move laterally into and out of the notch 171.

Although various mechanical means may be utilized for moving the pin 177, the form in FIG. 8 includes a cam plate 180 having an inclined cam slot 180a therein into which a cam follower or pin 177a extends so that movement of the plate 180 causes movement of the pin 177 substantially perpendicular thereto. The cam plate is guided in its movement between a guide wall 170a and an inside guide surface 190a of a retainer block 190. A spring 191 urges the cam plate 180 to the position shown to positively urge the pin 177 to the latched position. A control wire 192 is connected to the cam plate and to a control lever 193 which is pivotally connected at 193a to the handle 173.

When the lever 193 is pulled to the right (as viewed in FIG. 8), the wire 192 pulls the plate 180 to compress the spring 191 and move the slot 180a upwardly to cause the latch pin 177 to be retracted out of the notch 171, whereby the apparatus S–1 may be removed from the pipe P. Upon a release of the handle 193, the spring 191 expands and forces the plate 180 downwardly to the position shown to move the pin 177 into the latch position shown in FIG. 8.

It should be evident that the slip setting device S–1 may be used in place of the device S in connection with the other parts of the apparatus of FIGS. 1–7. Also, FIG. 8 illustrates that a single latch pin may be used instead of the two pins in the device S. Conversely, it will be evident that the FIG. 8 device may be made with two pins 177 if desired.

The foregoing disclosure and description of the invention are illustrative and explanatory thereof, and various changes in the size, shape, and materials as well as in the details of the illustrated construction may be made without departing from the spirit of the invention.

I claim:

1. An automatic pipe slip apparatus for supporting a pipe comprising:
  (a) a slip holder having an opening therethrough for receiving the pipe;
  (b) a plurality of wedge-shaped pipe gripping means spaced circumferentially around the opening in said slip holder for uniformly gripping the pipe on opposite sides of its longitudinal axis;
  (c) a plurality of slip carriers for movably supporting said pipe gripping means;
  (d) means for mounting said slip carriers in said slip holder for movement downwardly and upwardly relative thereto and for moving said pipe gripping means inwardly upon downward movement of said slip carriers and outwardly upon upward movement thereof;
  (e) means for mounting said pipe gripping means on said slip carriers for movement downwardly and upwardly relative thereto and for moving said pipe gripping means inwardly upon downward movement of said pipe gripping means relative to said slip carriers and outwardly upon upward movement thereof;
  (f) means for urging said slip carriers upwardly; and (g) means for urging said pipe gripping means upwardly.

2. The structure set forth in claim 1, including:
slip setting means for moving said slip carriers downwardly to engage said pipe gripping means with the pipe.

3. The structure of claim 1 wherein said slip holder comprises a U-shaped body having a removable side for closing the open side of said U-shaped body and means for securing the removable side to said U-shaped body.

4. The structure of claim 3 wherein said U-shaped body has vertically extending grooves adjacent its open end and said removable side has laterally extending tongue means for insertion into said grooves for connecting said removable side to said U-shaped member.

5. The structure of claim 2 wherein said slip setting means includes a body having a U-shaped opening therein for receiving a pipe and latch means on opposite sides of the U-shaped opening for movement into engagement with a pipe therein for connecting the body thereto.

6. The structure of claim 5 wherein said latch means comprises a pair of movable pins having means for moving said pins into said opening for engaging a pipe therein.

7. The structure of claim 6 wherein said means for moving said pins comprises fluid actuated piston means disposed in piston cylinders, means for conducting pressurized fluid to said piston cylinders for moving said piston means, valve means for controlling the flow of pressurized fluid to said piston cylinders, means for releasing said pressurized fluid from such cylinders, and retracting means for retracting said pins from engagement with the pipe when said pressurized fluid is released.

8. The structure of claim 2 including means connecting said slip setting means to a pipe extending through the opening in said slip holder for moving said pipe gripping means into engagement with the pipe upon lowering of the pipe and the slip setting means connected thereto relative to said slip holder.

9. The apparatus of claim 1 including inclined surface means in said slip holder for moving said carrier means radially inwardly and laterally downwardly with respect to said slip holder, and means for slidably connecting said pipe gripping means to said carrier means to permit downward movement of said pipe gripping means relative to said carrier means after said pipe gripping means have engaged said pipe to wedge said pipe gripping means between the pipe and said carrier means when the pipe is lowered after being engaged by the pipe gripping means.

10. The apparatus of claim 9 wherein said means for urging said pipe gripping means laterally upwardly relative to said carrier means includes a spring.

References Cited

UNITED STATES PATENTS

| | | | |
|---|---|---|---|
| 1,149,034 | 8/1915 | Despain | 24—263.5 |
| 1,541,662 | 6/1925 | Robinson | 24—263.5 |
| 1,625,540 | 4/1927 | Hertzberg | 24—263.5 |
| 1,676,275 | 7/1928 | Montgomery | 24—263.5 |
| 1,847,087 | 3/1932 | Greve | 24—263.5 |
| 1,883,073 | 10/1932 | Stone | 24—263.5 |
| 2,410,589 | 11/1946 | Segelhorst | 285—145 |
| 3,140,523 | 7/1964 | Taylor | 24—263.5 |
| 3,287,776 | 11/1966 | Brown | 24—263.5 |
| 3,358,341 | 12/1967 | Burstall | 24—263.5 |

DAVID J. WILLIAMOWSKY, Primary Examiner

D. W. AROLA, Assistant Examiner

U.S. Cl. X.R.

24—263